Jan. 17, 1933.    R. W. EIFERT    1,894,306
RAKE
Filed June 8, 1931
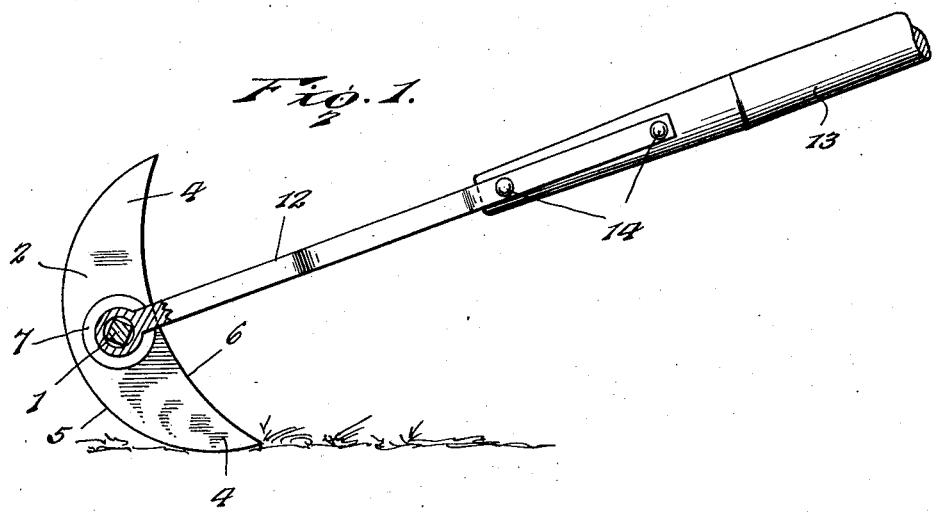
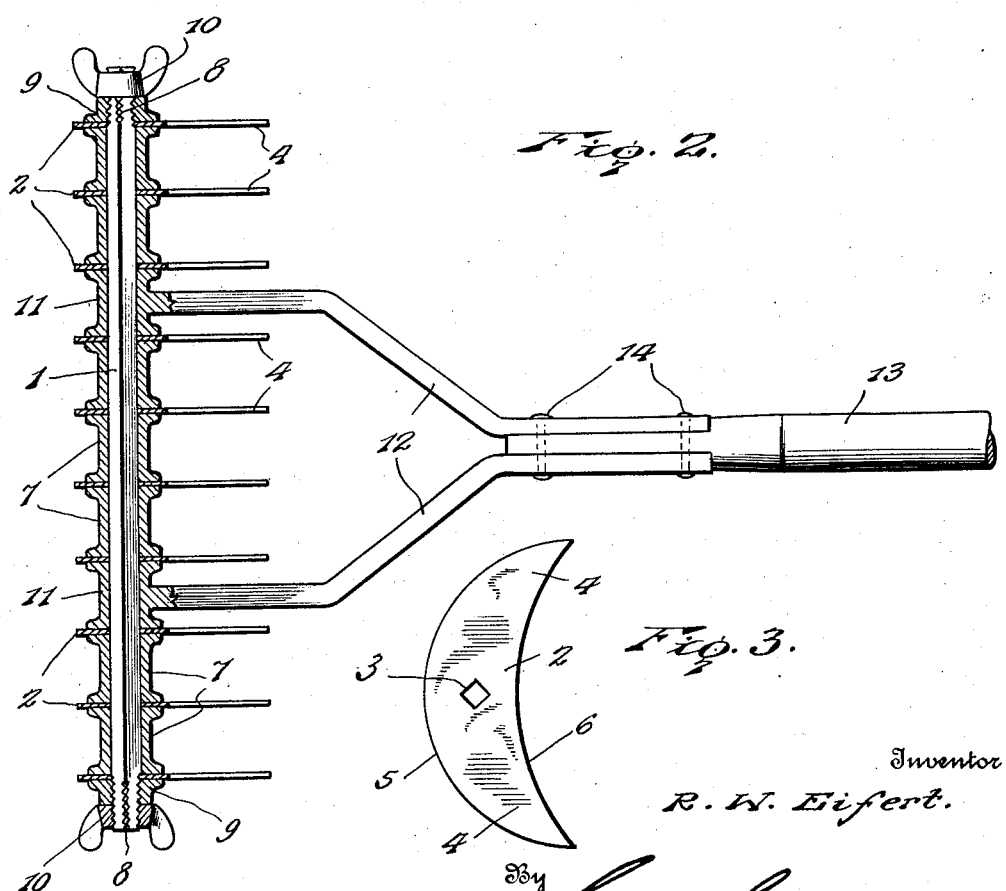
Inventor
R. W. Eifert.
By Lacey & Lacey,
Attorneys Patented Jan. 17, 1933

1,894,306

UNITED STATES PATENT OFFICE

ROY W. EIFERT, OF BUSHNELL, ILLINOIS

RAKE

Application filed June 8, 1931. Serial No. 542,952.

This invention relates to garden implements and more particularly to a rake which may be used for raking a lawn and also for breaking up soil around plants in a garden.

One object of the invention is to so construct the rake that when it is in use its teeth may slide easily along the ground when raking grass and serve very effectively to remove dead grass, leaves and the like from a lawn and to further so form the teeth that they may be very easily cleared of grass and leaves which may adhere to them during a raking operation.

Another object of the invention is to so form the teeth that they will project in opposite directions from a cross bar upon which they are mounted, thereby permitting the ends of the teeth to be selectively placed in engagement with the ground when the rake is in use.

Another object of the invention is to so form the teeth that they will constitute blades which may be employed for loosening earth in bare places in a lawn in order that grass seed may be sowed and also used as slicing blades by means of which soil in a garden bed may be easily broken and properly distributed.

Another object of the invention is to provide the head of the rake with improved arms for connecting the head of the rake with a rake handle and so associate these arms with the head of the rake that they will not be in the way when using the rake.

Another object of the invention is to so mount teeth forming blades and spacers for the same upon a cross bar or rod that they may be easily removed and new ones substituted when necessary.

The invention is illustrated in the accompanying drawing, wherein:

Figure 1 is a view showing the improved rake principally in side elevation and partially in section, Figure 2 is a top plan view of Figure 1 with the head of the rake shown in section, and Figure 3 is a side elevation of one of the teeth forming blades.

The improved rake has a head connected with a handle which may be of any length desired by arms extending rearwardly from the head and secured to the handle against opposite side portions thereof.

The head has a cross bar or rod 1 which is formed of strong metal and is rectangular in cross section as shown in Figure 1. Upon this cross bar is fitted a number of blades 2 which are formed of sheet metal of sufficient thickness to prevent the blades from bending and by referring to Figures 1 and 2 it will be seen that each of the teeth forming blades is crescent shaped and at its center is formed with an opening 3 conforming to the cross sectional shape of the rod 1. Therefore the blades will be prevented from turning about the cross bar or rod and their end portions 4 which form teeth for the rake will always extend in the same direction from the cross bar.

The arcuate edges 5 and 6 of the blades converge and intersect at the ends of the blades, thereby forming each blade with sharpened ends which will easily slice through top soil when the rake is used for loosening soil in bare places, in a lawn or for loosening the soil about plants in a garden bed. In view of the fact that the rear edges 5 are arcuate as shown in Figures 1 and 2 the rake will slide very easily along these edges and may be tilted forwardly or rearwardly in order to dispose the sharpened edges in contact with the ground or in spaced relation to the ground. This also permits either a slicing movement or chopping motion to be employed when loosening soil and it should also be noted that after the soil has been broken up it may be drawn forwardly and formed into hills about plants.

Between the blades are disposed spacers 7 which may be formed of wood or metal and upon the threaded end portions 8 of the cross rod are fitted spacers 9 for engagement by winged nuts 10 which when tightened will apply pressure longitudinally of the rod or bar and cause the blades and spacers to be firmly held in place thereon. Certain of the spacers which are designated by the numeral 11 are formed integral with the forward ends of the arms 12 which project rearwardly from the head of the rake and intermediate their ends are bent towards each other to dispose their rear end portions close together. These rear end portions of the arms extend along opposite side portions of the front end of a handle 13 where they are firmly secured by rivets or equivalent fasteners 14. By this arrangement the head of the rake will be firmly connected with the forward end of the handle and the rake may be used in the usual manner. In view of the fact that the spacers or sleeves 11 at the forward ends of the arms are disposed in spaced relation to ends of the rods or bar 1, end portions of the rake head will project outwardly from the arms and the arms will not be in the way when using the rake.

If certain of the blades should become bent or broken, they may be easily removed by unscrewing the nuts 10 and sliding the blades and spacers off of the rod, after which the bent blades may be straightened and replaced or new blades substituted for broken ones.

What is claimed is:

1. A rake comprising a head having a cross bar angular in cross section, teeth fitting upon said cross bar and consisting of fixed concavo-convex plates each formed intermediate its ends with an angular opening to receive the cross bar, said plates having their end portions projecting in opposite directions from the cross bar and each having its convex edge presented to the ground to form a rocking surface, arms extending rearwardly from said head, and a handle having its front end portion secured to said arms.

2. A rake comprising a head having a cross bar angular in cross section, teeth fitting upon said cross bar and consisting of flat plates each formed intermediate its ends with an angular opening to receive the cross bar, said plates being crescent shaped to provide each blade with a curved rocking edge terminating in a point, arms extending rearwardly from said head, and a handle having its front end connected with said arms.

In testimony whereof I affix my signature.

ROY W. EIFERT.